Dec. 1, 1936. A. O. SAMUELS 2,062,940
ELECTRIC SOLDERING IRON
Filed May 25, 1934
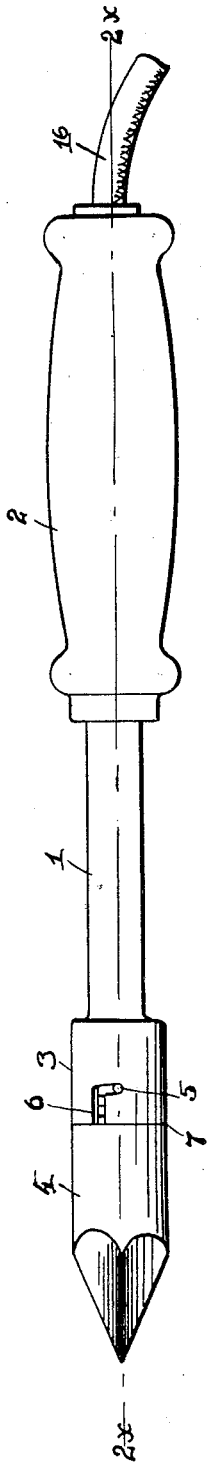
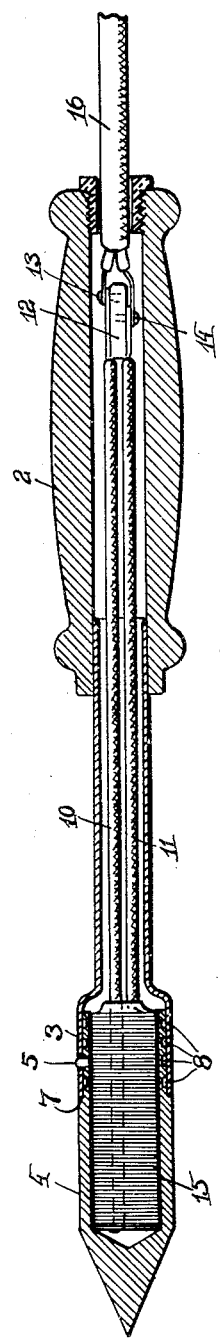
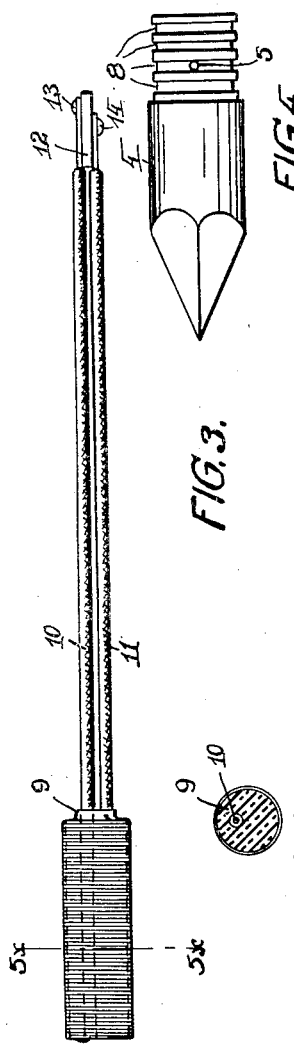
INVENTOR
ABE O. SAMUELS
BY
ATTORNEY Patented Dec. 1, 1936

2,062,940

UNITED STATES PATENT OFFICE 2,062,940

ELECTRIC SOLDERING IRON

Abe O. Samuels, Rochester, N. Y., assignor to Samson-United Corporation, Rochester, N. Y.

Application May 25, 1934, Serial No. 727,483

5 Claims. (Cl. 219—26)

This invention relates to electric soldering irons and has for one of its objects to provide an improved and simplified construction for such an iron.

Another object of this invention is to permanently mount the heating coil into the removable tip of the soldering iron to make it an integral part thereof and thus secure for the removable tip a high heating efficiency.

A further object of this invention is to provide the removable combined tip and heating coil of the soldering iron with means whereby it is quickly locked in place or removed from the soldering iron and electrically connected with or disconnected from the flexible cord thereof.

A further object of this invention is to so construct the removable tip of the soldering iron that the corrosion of the metal cannot cause the tip to stick to the iron and prevent the removal therefrom.

These and other objects of this invention will become more readily apparent from the detailed description thereof which follows, reference being had to the accompanying drawing in which Figure 1 is a side elevation of the electric soldering iron embodying my removable combined tip and heating coil.

Figure 2 is a longitudinal section thereof taken on the line 2x—2x of Figure 1.

Figure 3 is a detail view of the electric heating unit for the removable tip.

Figure 4 is a detail view of the removable tip.

Figure 5 is a cross section of the heating unit taken on the line 5x—5x of Figure 3.

In the several figures of the drawing like reference numerals indicate like parts.

The electric soldering iron construction forming the subject matter of my present invention comprises the hollow tubular shank 1 which is suitably fastened in the hollow handle 2. The outer end of the shank is enlarged to provide the socket 3 thereon. The soldering tip 4 is removably mounted into this socket and for this purpose the inner end of the soldering tip is reduced in diameter so as to have this end telescope into the socket 3 and be locked thereinto by means of the locking pin 5. This locking pin projects from the side of the reduced end of the soldering tip and slides into the bayonet slot 6 provided in the wall of the socket 3 when the reduced inner end of the tip is telescoped into the socket and is given a turn at the end of the telescoping movement. The lateral portion of the bayonet slot is slightly angular so that when the tip is given a turn the locking pin draws the tip into the socket so that the shoulder 7 provided at the inner end of the reduced portion of the tip will be drawn tightly against the end of the socket 3 to hold the tip rigidly in place on the end of the shank 1.

In order to make the soldering tip readily removable from the socket 3 and prevent a sticking of the soldering tip in the socket 3 due to the corrosion of the metals which takes place between the wall of the socket and the soldering tip, the outside of the reduced end of the soldering tip is grooved by a series of grooves 8, 8. The formation of these grooves reduces the contact surface between the soldering tip and the socket to a minimum and the edges of the grooves operate to scrape the inside wall of the socket every time the tip is removed from or attached to the socket of the shank. The use of the bayonet lock between the soldering tip and the socket thus provides a quick way of attaching and removing the tip while the grooving of the tip keeps the tip from "freezing" into the socket.

As heretofore pointed out the heating unit is embedded in the soldering tip so as to form an integral part thereof. This is done by winding the resistance coil of the heating unit on a suitable core 9 and connecting one lead therefrom thru a hole in the core to the leadwire 10 and connecting the other lead to the lead wire 11. These lead wires 10 and 11 are suitably insulated and are anchored to the core 6 so as to project from one end thereof. The outer ends of the lead wires are held spaced apart by the insulating block 12 and screws 13 and 14 anchor the ends of the leadwires to the insulating block and provide means whereby the ends of the electric cable or flexible cord are connected thereto.

The heating unit is held embedded in the hollow center of the soldering tip and insulated from the inner wall thereof by interposing suitable cement 15 between the coils of the heating unit and the inner wall of the tip so that when the cement has dried and hardened the tip with the heating unit forms a single unit.

From the foregoing it will be seen that the combined tip and heating unit is easily and quickly unlocked and removed from the socket 3 of the shank 2. The electrical connection is made by drawing the ends of the cable or flexible cord 16 thru the handle 2, the shank 1 and its socket 3 and connecting these ends to the lead wires 10 and 11. The insertion of the lead wires into the shank 11 will then locate the electric connection between the lead wires and the cable into the hollow interior of the handle and be held in place therein as soon as the soldering tip is locked to the shank.

I claim:

1. In an electric soldering iron the combination of a hollow shank, an enlarged socket formed on the end of said shank, said socket having a bayonet slot extending longitudinally and laterally into the end of the wall thereof, a soldering tip pointed at one end and reduced in diameter at the other end to provide an annular shoulder intermediate of said tip, a locking pin carried by the reduced end of said tip so as to engage into said bayonet slot on the insertion of the reduced end of said tip into said socket, said locking pin drawing the shoulder of said tip against the end of said socket on the turning of said tip and the engagement of said locking pin with the laterally extending portion of the bayonet slot.

2. In an electric soldering iron the combination as set forth in claim 1 with a heating unit carried by said soldering tip, lead wires projecting from said heating unit into said hollow shank, connecting means carried by said lead wires and an electric cable connected to said connecting means so as to be free to rotate with said lead wires on the turning movement of said soldering tip.

3. In an electric soldering iron, the combination of a hollow shank, a soldering tip telescopingly engageable into one end of said hollow shank, a heating element embedded in and cemented to said soldering tip so as to form a single unit therewith, interlocking means between said tip and said shank including a pin movable in a slot having an angular extension so as to provide a limited endwise and rotatable movement of the tip in the shank.

4. In an electric soldering iron as set forth in claim 3 with circular ridges formed around the inner end of said tip and suitably spaced from each other, said ridges being adapted to scrape the inner wall of the hollow shank on the insertion thereinto or withdrawal therefrom of said tip.

5. In an electric soldering iron, the combination of a hollow shank, an enlarged extension provided at one end of said hollow shank, a hollow soldering tip telescopingly engageable into said enlarged extension, a heating element completely embedded in and cemented into said soldering tip so as to be concealed therein and form a single unit therewith and means carried by said tip and cooperating with means on said enlarged extension to provide a limited endwise and rotatable movement of said tip in said enlarged extension of said hollow shank and hold said tip locked to said shank on the insertion of the tip into its enlarged extension.

ABE O. SAMUELS.